Jan. 12, 1960 H. E. BONNER ET AL 2,921,131

TELEVISION RECEIVERS

Filed Nov. 21, 1955 2 Sheets-Sheet 1

INVENTORS
HOWARD E. BONNER
ROBERT H. OVERDEER
BY
Dean U. Hazeltine
ATTORNEY

INVENTORS
HOWARD E. BONNER
ROBERT H. OVERDEER
BY
ATTORNEY

United States Patent Office 2,921,131

Patented Jan. 12, 1960

2,921,131

TELEVISION RECEIVERS

Howard E. Bonner, Oreland, and Robert H. Overdeer, Jenkintown, Pa., assignors to Philco Corporation, Philadelphia, Pa., a corporation of Pennsylvania Application November 21, 1955, Serial No. 548,051

7 Claims. (Cl. 178—7.3)

Figures 1, 6:
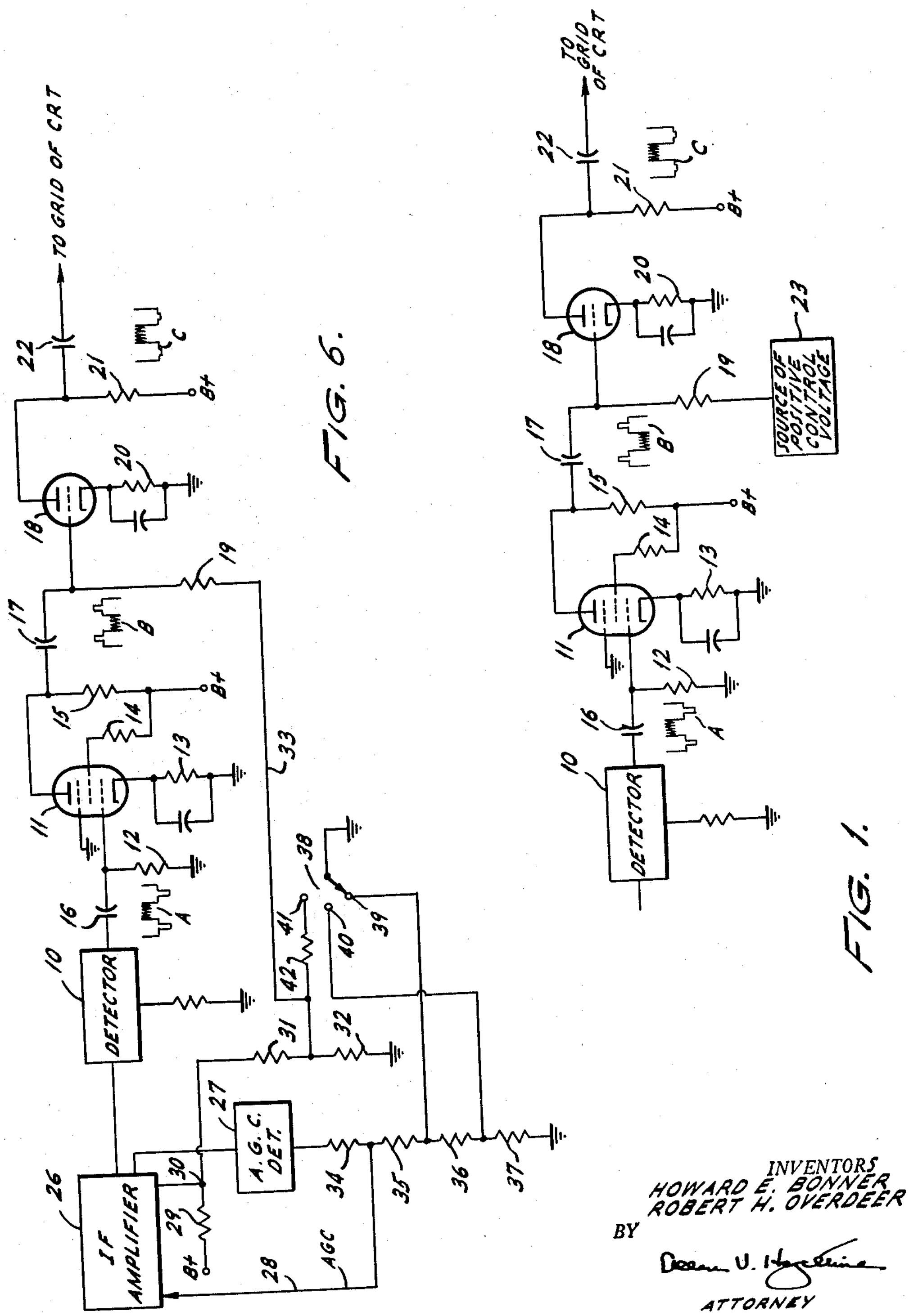

This invention relates to television receivers in which both the video and sync components of the incoming signal are supplied to the video amplifier of the receiver, and the output of said amplifier is supplied to the display device with the video component positive in relation to the blanking level. Since the sync component is of negative polarity, it has no effect upon the display device. Most television receivers are now of this type.

In such a receiver, the video amplifier stage immediately preceding the display device inverts the polarity of the video and sync components, and therefore it is necessary to supply the composite signal to said stage with the sync component positive and with the video component negative. However, this results in poor utilization of the last amplifier stage because the sync component occupies the linear portion of the transfer characteristic of that stage and, except in the case of a weak signal, a substantial part of the video component may occupy the non-linear portion of said characteristic, with the result that the video component is not faithfully reproduced in the output of the last amplifier stage. Consequently the white portion of the video signal is compressed, giving decreased contrast and incorrect gamma in the display. Furthermore, in some cases, a significant white portion of the signal may extend below the cut-off point of the tube and may thus be lost.

The principal object of the present invention is to overcome these objections and to provide a method and system by which the video component may be better reproduced by the amplifier stage immediately preceding the display device, and said stage may be utilized to better advantage.

This object is achieved by controlling the operating potential level of the control grid of the last video amplifier tube in relation to the potential of the cathode thereof so that the negative video component is caused to occupy a desired range of the transfer characteristic of the tube, and the positive sync component is clipped at the grid potential level corresponding to the cathode potential. Thus whenever the sync component drives the grid positive with respect to the cathode, grid current flows and this effectively removes or erases either part or all of the sync component as an incident to occupancy of a desired range of the transfer characteristic by the video component. Since the sync component has no useful effect upon the display device, removal of part or all of that component is of no consequence.

In practice, it has been found that the degree of control required to accomplish the purpose of this invention varies according to the signal strength. In the case of a weak signal, the video component may occupy the linear portion of the transfer characteristic of the last video amplifier stage, and in such instance little, if any, control is necessary. However, as the signal strength increases, the required degree of control increases accordingly, for the greater the signal strength the more tendency there is for a significant portion of the video component to occupy the non-linear portion of the transfer characteristic or even be cut off. Moreover, with a fixed degree of control suitable for strong signals, it has been found that noise in the presence of a weak signal tends to cause erasure of the entire signal.

Accordingly, a further object of this invention is to provide for control of the operating potential level of the control grid of the last video amplifier tube according to the strength of the incoming signal.

The invention may be fully understood from the following detailed description with reference to the accompanying drawings, wherein Fig. 1 is a diagrammatic illustration of a two-stage video amplifier to which the present invention is applied;

Figs. 2 to 5 illustrate different conditions of operation with and without this invention; and Fig. 6 is a diagrammatic illustration of a preferred embodiment of the invention.

Referring first to Fig. 1 there is shown a two-stage video amplifier to which is supplied from the usual detector 10 the composite signal containing both the video and sync components. The first video amplifier stage comprises a pentode 11, grid resistor 12, cathode biasing resistor 13, screen grid limiting resistor 14, and plate load resistor 15. The signal is supplied from the detector 10 to the control grid of tube 11 through coupling condenser 16. The output signal developed across load resistor 15 is supplied through coupling condenser 17 to the control grid of the second amplifier tube 18 which is preferably a triode. In addition to tube 18, the second amplifier stage comprises grid resistor 19, cathode biasing resistor 20, and plate load resistor 21. The output signal of the second stage is supplied through coupling condenser 22 to the grid of the usual cathode ray tube.

The two-stage video amplifier as thus far described is conventional, disregarding for the moment the block 23 and assuming that the grid resistor 19 is connected to ground as in prior systems of this type. The present invention may be best understood by considering first the usual operation of the conventional system as generally depicted in Fig. 2.

As hereinbefore mentioned, it is necessary to supply the output of the last amplifier stage to the grid of the cathode ray tube with the video component positive in relation to the blanking level. Therefore, the composite signal is supplied to the control grid of the second amplifier tube with the sync component positive and with the video component negative. As shown at A in Fig. 1, the composite signal as supplied by the detector 10 is sync negative and video positive, and as shown at B the signal as it is supplied to the grid of tube 18 is sync positive and video negative.

Figure 2:
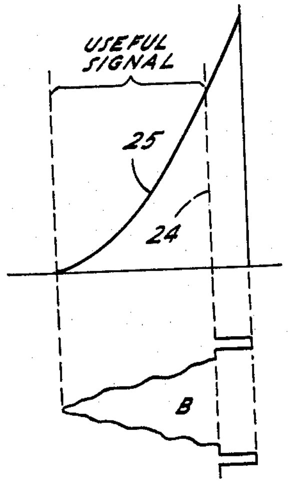

Referring now to Fig. 2, if the grid resistor 19 were connected to ground, the operating potential at the grid of tube 18 would be negative with respect to the cathode potential, as represented for example by the broken line 24. With a signal of normal strength, the sync component of the signal would occupy the linear portion of the transfer characteristic 25, while the video component would extend into the non-linear portion of the characteristic. As previously mentioned, the effect of this would be to compress at least the white portion of the video signal, with consequent decreased contrast and incorrect gamma in the display. Thus, as may be seen in Fig. 2, the white portion of the video signal occupies the lowermost curved portion of the characteristic and is therefore compressed.

The full significance of this in a system of the character illustrated in Fig. 1 will now be explained. It is economical and advantageous to employ a pentode in the first video amplifier stage and a triode in the second stage, because the pentode supplies most of the gain and the triode with its wide range of grid swing serves primarily to drive the display device. In order to realize the maximum output voltage, the triode must be driven over substantially its entire operating range from zero bias to cut off. Now since the sync component occupies about 25% of the total amplitude range of the composite signal, it is apparent that heretofore about 25% of the dynamic range of the driver tube characteristic has been wasted on the sync component.

Referring again to Fig. 1, the present invention overcomes the above-discussed objection by controlling the operating potential level of the control grid of triode 18, in relation to the potential of the cathode thereof, so that the negative video component is caused to occupy a desired range of the transfer characteristic of the tube, and the positive sync component is clipped at the grid potential level corresponding to the cathode potential. This control is effected by means of a source of positive control or biasing voltage connected to the lower end of the grid resistor 19, such a source being generally represented in Fig. 1 by the block 23.

Figure 3:
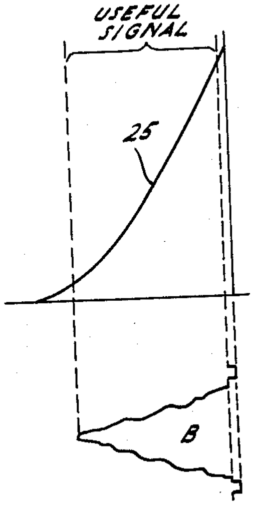

Fig. 3 shows the mode of operation of the output tube 18 with the present invention embodied in the system and with the same signal amplitude as in Fig. 2. Specifically, Fig. 3 depicts the mode of operation in the case of a normal signal whose video component may occupy substantially the entire linear portion of the transfer characteristic 25. In this instance, the positive biasing voltage from source 23 is of sufficient magnitude to raise the operating potential level of the control grid of tube 18 substantially to the cathode potential. With this condition of opertaion, practically the entire sync component of the composite signal B is positive with respect to the cathode potential, and therefore practically the entire sync component is clipped by virtue of the fact that the sync pulses drive the grid positive with respect to the cathode and cause grid current to flow. Thus, in this instance, the signal is clipped at or near the blanking level, and the signal appearing across the plate load resistor 21 is of the form shown at C in Fig. 1. Thus, instead of having an output signal of which only about 75% is useful picture information, we now have an output signal practically the whole of which is useful picture information. Furthermore, this all-picture signal is a faithful reproduction of the video component of the signal applied to the grid of tube 18.

It should be noted that still another advantage derives from this invention. It is a known fact that the transient response of a triode amplifier is a function of the signal position on the transfer characteristic, being faster in the low bias region. The control effected by this invention causes the useful portion of the input signal to occupy the best transient response region, which is an additional advantage.

Figure 4:
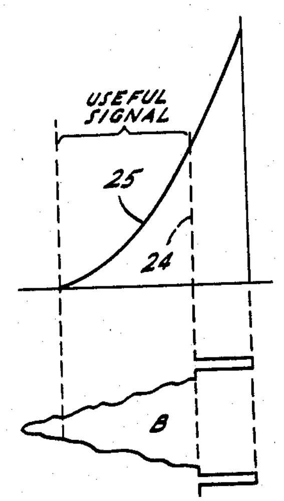
Figure 5:
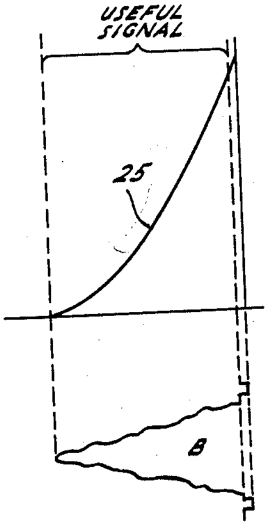

As hereinbefore mentioned, it is desirable to utilize substantially the entire operating range of the triode 18 from zero bias to cut-off. Since the peak white portion of the video signal contributes very little to the picture, it is of little consequence if this portion occupies the lowermost portion of the transfer characteristic. It should be noted, therefore, that this invention makes possible the utilization of the entire operating range of triode 18 for the video signal. This is illustrated in Figs. 4 and 5. Fig. 4 shows what would happen, without this invention, if the input signal to triode 18 were substantially increased in amplitude from that shown in Fig. 2. It can be seen that the best portion of the transfer characteristic would be occupied by the sync component and a substantial part of the video component would be cut off. Fig. 5 shows the operation, with the same signal amplitude, obtained by the use of this invention. The sync component is now clipped, and the video component occupies the entire operating range, giving a much greater range of useful signal.

In actual practice of this invention, it has been found that where the incoming signal varies considerably in strength, as is generally the case, it is desirable to effect varying control of the operating potential level of the grid of the output tube in direct proportion to varying strength of the signal. With a fixed control voltage suitable for opertaion on a strong signal, it has been found that noise in the presence of a weak signal tends to drive the grid excessively positive and thus tends to wipe out the signal. The degree of control required for the purpose of this invention varies from a maximum, in the case of a strong signal, to a minimum or substantially zero, in the case of a weak signal.

Variable control to meet this requirement may be effected by utilizing a biasing voltage which tracks the signal, i.e., varies directly with the signal strength. This tracking biasing voltage may be derived or produced in any suitable manner. Fig. 6 shows, by way of example, one arrangement which may be employed.

In Fig. 6, the two-stage video amplifier is identical with that of Fig. 1, and therefore the components are designated by the same reference characters. The usual IF amplifier and AGC detector are represented in block form at 26 and 27, the AGC voltage being applied over conductor 28. The B+ voltage for the IF amplifier tubes is supplied through resistor 29, and due to the AGC action the positive voltage at point 30 varies according to the signal strength. The biasing voltage is derived from this point, by way of the voltage divider comprising resistors 31 and 32, and is applied over conductor 33 to the grid of tube 18.

The reason why the positive voltage at point 30 varies according to the signal strength is as follows. The AGC voltage supplied by the AGC detector varies according to the signal strength and causes variation of plate current in the IF amplifier tubes. When the signal strength increases, the AGC voltage increases and causes decrease of the plate current in the IF amplifier tubes. Consequently, the voltage drop across resistor 29 decreases and the voltage at point 30 rises. On the other hand, when the signal strength decreases, the AGC voltage decreases and causes increase of the plate current in the IF amplifier tubes. Consequently, the voltage drop across resistor 29 increases and the voltage at point 30 decreases. Thus, it will be seen that the point 30 is a convenient point for derivation of a suitable variable biasing voltage for the purpose of this invention, although as previously indicated the biasing voltage may be derived in any suitable manner.

If desired, provision may be made for effecting control action in different ranges according to the different strengths of receivable signals from different transmitting stations. In the embodiment shown in Fig. 6, this may be accomplished by utilizing the switch which is provided in some television receivers for effecting discrete changes in the AGC operation according to the different strengths of receivable signals. Thus, in Fig. 6, the AGC voltage is derived from the voltage divider comprising resistors 34 to 37, and the dividing ratio is changeable by means of switch 38 which, in positions 39 and 40, effectively short circuits different portions of the voltage divider for operation respectively on strong and normal signals. In position 41, for operation on weak signals, the entire AGC divider is effective and resistor 32 is shunted by a resistor 42 of relatively low value. This places the grid of tube 18 at a low operating potential level close to ground potential.

In this arrangement, the switch 38 in each of its positions effectively establishes a particular operating voltage level at point 30 for the control action of the present invention, and in position 41 the switch also changes the effective dividing ratio of the control voltage divider and places the grid of tube 18 near ground potential.

In operation of this system, the biasing voltage derived by way of conductor 33 is always such as to cause the video component of the signal to occupy a desired range of the transfer characteristic of triode 18. Since the positive biasing voltage varies with the strength of the incoming signal, the operating potential level of the grid of tube 18 is varied accordingly. Whenever the signal strength is sufficient to cause the operating potential level of the grid of tube 18 to approach the cathode potential, the sync component is clipped either in part or in its entirety. Thus, when the signal strength is a maximum, the operating potential level of the grid practically coincides with the cathode potential, and practically the entire sync component is clipped. On the other hand, when the signal is weak, the operating potential level of the grid is near ground potential, and the previously mentioned adverse effect of noise on weak signals is effectively eliminated. For signals of intermediate strengths, the operating potential level of the grid is varied accordingly.

Moreover, in the illustrated system, different ranges of operation are provided according to widely different strengths of signals from different transmitting stations. This is desirable where such widely different signal strengths exist, but of course it is in the nature of a refinement and it is an optional feature.

While the invention has been described herein with particular reference to a preferred embodiment, it will be understood that the invention is not limited thereto but contemplates such modifications and other embodiments as may be resorted to without departure from the spirit and scope of this invention.

We claim:

1. In a television receiver wherein the video signal supplied to the display device is positive in relation to the blanking level, a signal transfer stage immediately preceding the display device, said stage including a vacuum tube having at least triode elements and including means for causing said tube to have an inherent transfer characteristic which extends over a range of negative control grid potentials between zero grid potential and a cut-off grid potential, and which is non-linear in the vicinity of cut-off and substantially linear at less negative grid potentials, means for supplying both the video and sync components of received signals to the control grid of said tube with the video negative and the sync positive, the sync component tending to occupy the linear portion of said characteristic and the video component tending to extend into the non-linear portion and thus tending to be distorted, and means for applying to said grid a positive biasing voltage of sufficient magnitude to raise the operating potential level of said grid sufficiently to cause the video component to occupy said linear portion and to cause such clipping of the sync component as is necessary to so locate the video component.

2. In a television receiver including an automatic gain control system which causes the voltage at a point in the receiver to vary directly with the strength of the incoming signal, a video output stage from which the video signal is to be supplied in positive relation to the blanking level, said stage including a vacuum tube having at least triode elements and including means for causing said tube to have an inherent transfer characteristic which extends over a range of negative control grid potentials between zero grid potential and a cut-off grid potential, and which is non-linear in the vicinity of cut-off and substantially linear at less negative grid potentials, means for supplying both the video and sync components of the received signal to the control grid of said tube with the video negative and the sync positive, the sync component tending to occupy the linear portion of said characteristic and the video component tending to extend into the non-linear portion and thus tending to be distorted, means for deriving a voltage from the aforementioned point at which the voltage varies directly with the signal strength due to automatic gain control action, and means for supplying the derived voltage to said grid to raise the operating potential level of the grid sufficiently to cause the video component to occupy said linear portion and to cause such clipping of the sync component by grid conduction as is necessary to so locate the video component.

3. A television receiver according to claim 2, including a two-stage video amplifier whereof said output stage is the second stage and includes a triode, and the first stage includes a pentode.

4. In a television receiver, an intermediate frequency amplifier, a plate circuit for said amplifier including a source of plate supply voltage, a voltage dropping resistor included in said plate circuit between said source and said amplifier, an automatic gain control system connected to said amplifier to vary the current in said plate circuit in inverse relation to the strength of an incoming signal, whereby the voltage at the end of said resistor remote from said source is caused to vary according to the strength of the incoming signal, a video output stage from which the video signal is to be supplied in positive relation to the blanking level, said stage including a vacuum tube having at least triode elements and including means for causing said tube to have an inherent transfer characteristic which extends over a range of negative control grid potentials between zero grid potential and a cut-off grid potential, and which is non-linear in the vicinity of cut-off and substantially linear at less negative grid potentials, means for supplying both the video and sync components of the received signal to the control grid of said tube with the video negative and the sync positive, the sync component tending to occupy the linear portion of said characteristic and the video component tending to extend into the non-linear portion and thus tending to be distorted, and means for deriving a voltage from the said end of said resistor and for supplying the derived voltage to said grid to raise the operating potential level of the grid sufficiently to cause the video component to occupy said linear portion and to cause such clipping of the sync component by grid conduction as is necessary to so locate the video component.

5. A television receiver according to claim 4, wherein the means for deriving and supplying said voltage comprises a voltage divider connected to the said end of said resistor.

6. A television receiver according to claim 4, wherein said automatic gain control system includes a voltage divider, said receiver further comprising means for changing the dividing ratio of said divider for signals of different strengths from different transmitting stations, whereby said derived voltage is caused to be at different voltage levels for said signals from different transmitting stations.

7. A television receiver according to claim 2, further including means for establishing said derived voltage at different levels for signals of different strengths from different transmitting stations.

References Cited in the file of this patent

UNITED STATES PATENTS

| | | |
|---|---|---|
| 2,292,765 | Malling | Aug. 11, 1942 |
| 2,500,831 | Kerkhof | Mar. 14, 1950 |
| 2,631,230 | Marsh | Mar. 10, 1953 |

FOREIGN PATENTS

| | | |
|---|---|---|
| 515,302 | Great Britain | Dec. 1, 1939 |